(12) United States Patent
Krishnaswamy et al.

(10) Patent No.: US 9,247,106 B2
(45) Date of Patent: Jan. 26, 2016

(54) COLOR CORRECTION BASED ON MULTIPLE IMAGES

(71) Applicant: Google Inc., Mountain View, CA (US)

(72) Inventors: Aravind Krishnaswamy, San Jose, CA (US); Nicholas Butko, Mountain View, CA (US); David Cohen, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/665,350

(22) Filed: Mar. 23, 2015

(65) Prior Publication Data

US 2015/0304525 A1      Oct. 22, 2015

Related U.S. Application Data

(63) Continuation of application No. 13/647,594, filed on Oct. 9, 2012, now Pat. No. 9,002,109.

(51) Int. Cl.
| | |
|---|---|
| *G06K 9/00* | (2006.01) |
| *H04N 1/60* | (2006.01) |
| *H04N 9/64* | (2006.01) |
| *H04N 9/73* | (2006.01) |
| *H04N 21/44* | (2011.01) |
| *H04N 21/4402* | (2011.01) |

(Continued)

(52) U.S. Cl.
CPC ........... *H04N 1/6027* (2013.01); *H04N 1/6072* (2013.01); *H04N 1/6075* (2013.01); *H04N 1/6086* (2013.01); *H04N 9/643* (2013.01); *H04N 9/73* (2013.01); *H04N 21/4402* (2013.01); *H04N 21/44008* (2013.01); *H04N 21/4788* (2013.01); *H04N 21/8153* (2013.01)

(58) Field of Classification Search
USPC ......... 382/167, 162, 218, 118, 181, 263, 224, 382/165, 276, 305, 308; 455/418, 420, 450, 455/414.1, 556.1; 707/737
See application file for complete search history.

(56) References Cited

U.S. PATENT DOCUMENTS

| 7,020,330 B2 | 3/2006 | Schroder |
|---|---|---|
| 7,110,597 B2 | 9/2006 | Goldsmith |

(Continued)

FOREIGN PATENT DOCUMENTS

| JP | 2000013622 | 1/2000 |
|---|---|---|
| WO | 2008000805 | 1/2008 |

OTHER PUBLICATIONS

Tsukada M et al; "Image Quality Enhancement Method Based on Scene Category Classification and Its Evaluation"; Consumer Electronics, 2009; ICCE '09; Digest of Technical Papers International Conference on IEEE; Piscataway, NJ, USA; Jan. 10, 2009; pp. 1-2.

(Continued)

*Primary Examiner* — Ahn Do
(74) *Attorney, Agent, or Firm* — IP Spring (57) ABSTRACT

In some implementations, a method provides color corrections based on multiple images. In some implementations, a method includes determining one or more characteristics of each of a plurality of source images and determining one or more similarities between the one or more characteristics of different source images. The source images are grouped into one or more groups of one or more target images based on the determined similarities. The method determines and applies one or more color corrections to the one or more target images in at least one of the groups.

20 Claims, 5 Drawing Sheets

(51) Int. Cl.
*H04N 21/4788* (2011.01)
*H04N 21/81* (2011.01)

(56) References Cited

U.S. PATENT DOCUMENTS

| | | | |
|---|---|---|---|
| 7,653,246 | B2 | 1/2010 | Hibi |
| 8,018,494 | B2 | 9/2011 | Yokomitsu et al. |
| 8,594,426 | B2 | 11/2013 | Bryant et al. |
| 8,611,655 | B2 | 12/2013 | Bryant et al. |
| 8,698,913 | B2 | 4/2014 | Yokomitsu et al. |
| 8,873,813 | B2 * | 10/2014 | Tadayon et al. ............... 382/118 |
| 2002/0150291 | A1 | 10/2002 | Naf et al. |
| 2004/0258302 | A1 | 12/2004 | Miwa et al. |
| 2007/0071317 | A1 | 3/2007 | Kubo |

OTHER PUBLICATIONS

European Patent Office; International Search Report, PCT/US2013/063948; Jan. 15, 2014; 3 pages.

V. Bychkovsky, S. Paris, E Chan, and F. Durand; "Leanring Photographic Global Tonal Adjustment with a Database of Input/Output Image Pairs"; IEEE Computer Vision and Pattern Recognition (CVPR); Jun. 2011; pp. 97-104.

Tsukada M et al.; "Image Quality Enhancement Method Based on Scene Category Classification and Its Evaluation"; Consumer Electronis, 2009; ICCE'09; Digest of Technical papers International Conference on IEEE; Pisataway NJ USA; Jan. 10, 2009; pp. 1-2.

USPTO; Related case U.S. Appl. No. 13/647,594 history: Non-final office action dated Apr. 22, 2014; Notice of Allowance dated Sep. 15, 2014; Notice of Allowance dated Dec. 17, 2014.

* cited by examiner

COLOR CORRECTION BASED ON MULTIPLE IMAGES

RELATED APPLICATIONS

This application is a continuation of and claims priority benefit to U.S. patent application Ser. No. 13/647,594, now U.S. Pat. No. 9,002,109 filed Oct. 9, 2012, all of which is incorporated herein by reference in its entirety.

BACKGROUND

The popularity and convenience of digital cameras as well as the widespread of use of Internet communications have caused user-produced images such as photographs to become ubiquitous. For example, users of Internet platforms and services such as email, bulletin boards, forums, and social networking services post images for themselves and others to see. Many captured images, however, have a color cast in which the colors are unbalanced or skewed in undesirable ways due to camera settings, lighting conditions, or other factors. It may become tedious for a user to manually examine each image and adjust the colors to desired values if needed. Some applications and devices provide an automated color correction function in which the colors of an image is analyzed using particular methods such as a histogram analysis, and the colors in that image are shifted to provide a more balanced distribution. However, many existing automated functions are limited in their ability to correct colors and can often produce incorrect or undesirable changes in the colors of images.

SUMMARY

Implementations of the present application relate to color correction of multiple images. In some implementations, a method includes determining one or more characteristics of each of a plurality of source images and determining one or more similarities between the one or more characteristics of different source images. The source images are grouped into one or more groups of one or more target images based on the determined similarities. The method determines and applies one or more color corrections to the one or more target images in at least one of the groups.

Various implementations and examples of the above method are described. The one or more characteristics can include color data derived from pixels of the source images. The source images and the target images can each include a plurality of pixels, and the color data can be derived from a hue of each pixel in the source images, where the color corrections adjust one or more hues of the pixels in the target images. The color data can include a color gamut of values of a color property of each of the plurality of source images, and/or a distribution of the values of the color property within the color gamut. The one or more characteristics include time data derived from the source images and indicating a time of capture of each of the source images. The one or more characteristics can include at least one of: a time of capture of each image, a setting of a camera capturing each image, a distribution of color data in each image, and at least one object depicted in each image.

In some implementations of the above method, determining similarities can include clustering hue values within each source image to determine a distribution of hue values for each source image, and comparing the distributions of the source images to find at least one of the similarities. Grouping the source images into target images can include dividing the source images into different groups based on the characteristics, where each group is its own independent set of target images for application of at least one of the color corrections. The color corrections can be different such that a different one of the color corrections is applied for each different group of target images. The correction can be applied to multiple target images in a group. A confidence in the color correction can be estimated and the color correction can be applied by a magnitude based on the confidence.

Determining the color corrections in the above method can include various features, such as examining color data derived from the one or more target images in one of the groups to determine a color correction applied to each target image in that group, and/or identifying an object in at least one of the target images and accessing reference color data associated with the identified object. For example, in some implementations, the above method can identify an object depicted in at least one of the one or more target images, where the object is associated with known correct color data that is obtained as the color data. Identifying the object can include at least one of: recognizing the object as a face of a person using a facial recognition technique, recognizing the object using an object recognition technique, and examining one or more tags associated with the one or more target images, wherein the one or more tags identify the object in the image.

A method can include, in some implementations, examining multiple source images to determine one or more characteristics of each of the source images. The source images can each include a plurality of pixels and the characteristics can include color data derived from the pixels in the plurality of source images. One or more similarities are determined between the one or more characteristics of different source images, including similarities based on the color data derived from the pixels in the plurality of source images. The source images are grouped into one or more groups of one or more target images based on the determined similarities. The method determines an associated color correction for the one or more target images in each group based on at least part of the color data. The method applies the associated color correction to the one or more target images in each group, including adjusting one or more color properties of each pixel in the one or more target images from one or more existing values to one or more adjusted values.

In some implementations, a system can include a storage device and at least one processor accessing the storage device and operative to perform operations. The operations include determining one or more characteristics of each of a plurality of source images, determining one or more similarities between the characteristics of different source images, grouping the source images into one or more groups of one or more target images based on the determined similarities; and determining and applying one or more color corrections to the target images in at least one of the groups.

In various implementations and examples of the above system, the operation of determining one or more of the similarities can include clustering hue values within each source image to determine a distribution of hue values for each source image, and comparing the distributions of the source images to find at least one of the similarities. Different color corrections can be applied for each different group of target images. The operation of determining the color corrections can include examining color data derived from the target images in one of the groups to determine a color correction applied to each target image in that group. The operation of determining and applying the color correction can include estimating a confidence in the color correction and applying the color correction by a magnitude based on the confidence.

DETAILED DESCRIPTION

One or more implementations described herein relate to color correction of images based on multiple images. Various implementations examine characteristics of number of source images, such as color data, and find similarities in the characteristics. Based on the similarities, a system groups the source images into groups of target images and determines color corrections to apply to the groups of target images. In some implementations, the system can examine various types of characteristics from the source images, including color data, timestamps, and identified objects (including recognized faces and people), as the basis for grouping images for similarity and for determination of a color correction to grouped images. The system can use color data derived from multiple images and/or one or more reference images to correct colors in the target images. These and other described features can lead to automatically-determined, appropriate and high quality color corrections to images for a user.

The system can perform color correction which can include correction or color balancing of a color property, such as hue, of one or more images. The system can examine multiple source images (such as images in an album or other collection) and determine which of the source images have similar characteristics to each other. Some characteristics that can be examined include color data such as color gamut and hue distributions in the images. The system can also examine other characteristics such as timestamps describing when the images were captured, and camera settings at the time of image capture. Some implementations can examine characteristics such as identified or recognized content depicted in the source images.

Based on the similarities, the system can group the source images into one or more groups of target images that have similar characteristics. In some implementations, the system can determine and apply a different color correction to each group of target images, based on data related to the target images. For example, the related data can be characteristics, such as color data, derived from the target images in the group, and which is used to determine a color correction to apply to each of the similar target images in that group. In one example, if a hue distribution in the color data indicates that the hues are too concentrated in one color (such as red) in the grouped target images, then the system can determine and apply a color correction to the target images which distributes the hues more evenly over all the color range (such as including blue and green hues). Thus, multiple images that are used to determine a color correction can be corrected using that same color correction. In other examples, the system can use color data from an associated source, such as a reference image that has recognized content that matches at least one of the target images. A color correction determined for a particular target image can be applied to the other target images in its group, which are sufficiently similar to the particular image. In some implementations, the system can estimate how reliable a determined color correction is, and can apply that color correction with a magnitude based on the estimation. For example, a color correction based only on color data from two target images may be less reliable than a correction based on 10 images, which may be less reliable than a correction based on a reference image.

Such features allow automated color correction for images which has a higher occurrence of desirable corrections. For example, color correction based on multiple image sources allows more accurate and consistent color corrections of images. Additional sources of color data such as from reference images, as well as the use of other characteristics such as timestamps over multiple images, further allows accurate color correction to images. Features described herein can more accurately and satisfactorily correct color in multiple similar images, and require no manual corrections by the user.

Figure 1:
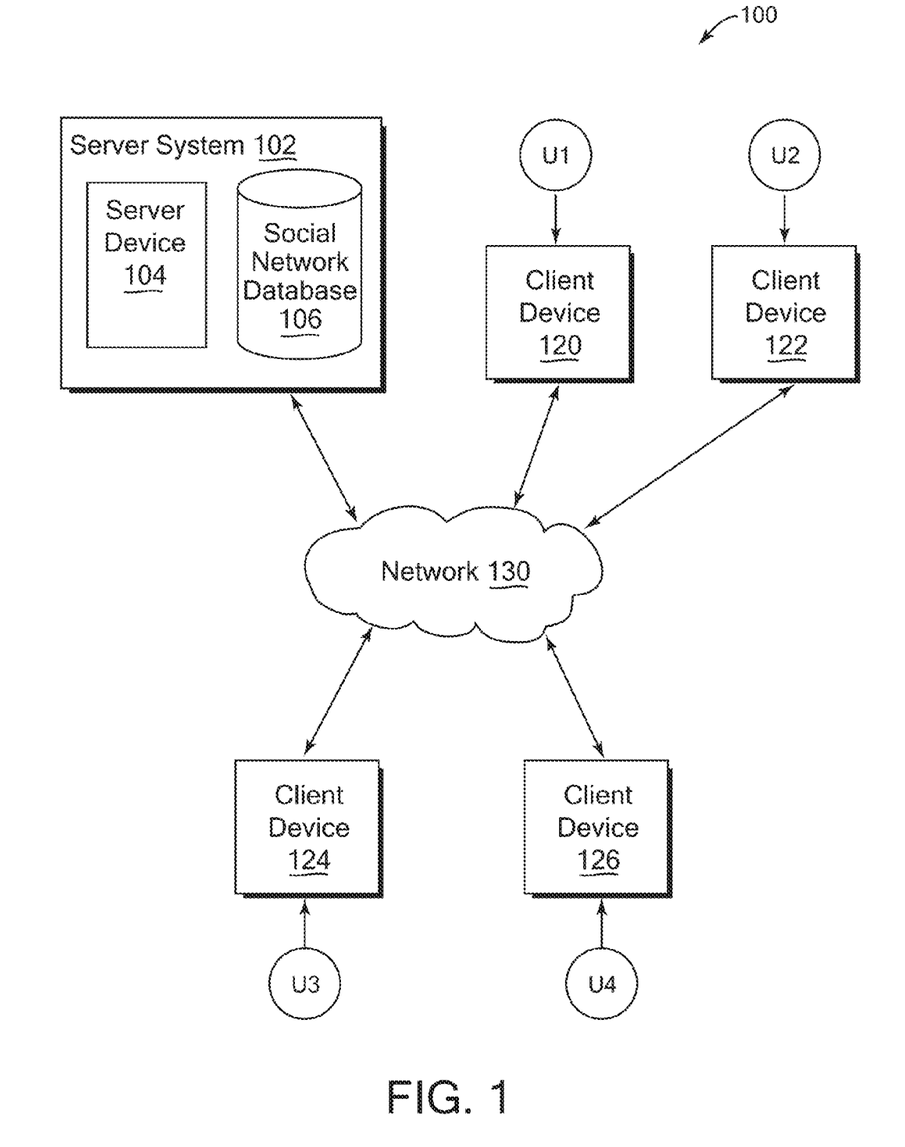
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a social network database 106 or other storage device. Network environment 100 also can include one or more client devices, such as client devices 120, 122, 124, and 126, which may communicate with each other via network 130 and server system 102. Network 130 can be any type of communication network, including one or more of the Internet, local area networks (LAN), wireless networks, switch or hub connections, etc.

For ease of illustration, FIG. 1 shows one block for server system 102, server device 104, and social network database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, social network database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with each other using respective client devices 120, 122, 124, and 126, and respective to features described herein each user can receive messages and notifications via a social network service implemented by network system 100. In one example, users U1, U2, U3, and U4 may interact with each other via the social network service, where respective client devices 120, 122, 124, and 126 transmit communications and data to one or more server systems such as system 102, and the server system 102 provides appropriate data to the client devices such that each client device can receive shared content uploaded to the social network service via the server system 102.

The social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat with other users of the service, etc. For example, a user can designate one or more user groups, such as "friends lists," family lists, occupation lists, etc., to allow users in the designated user groups to access or receive content and other information associated with the user on the social networking service. In some implementations, the access of users to user information can be designated in terms of larger groups, such as a "public" setting designating all the users of the social network service. As used herein, the term "social networking service" can include a software and/or hardware system that facilitates user interactions, and can include a service implemented on a network system. In some implementations, a "user" can include one or more programs or virtual entities, as well as persons that interface with the system or network.

A social networking interface, including display of content and communications, privacy settings, notifications, and other features described herein, can be displayed using software on the client device, such as application software or client software in communication with the server system. The interface can be displayed on an output device of the client device, such as a display screen. For example, in some implementations the interface can be displayed using a particular standardized format, such as in a web browser or other application as a web page provided in Hypertext Markup Language (HTML), Java™, JavaScript, Extensible Markup Language (XML), Extensible Stylesheet Language Transformation (XSLT), and/or other format.

Other implementations can use other forms of systems and services instead of social networking systems and services. For example, users accessing any type of computer network can make use of features described herein. Some implementations can provide features described herein on client or server systems disconnected from or intermittently connected to computer networks.

Figure 2:
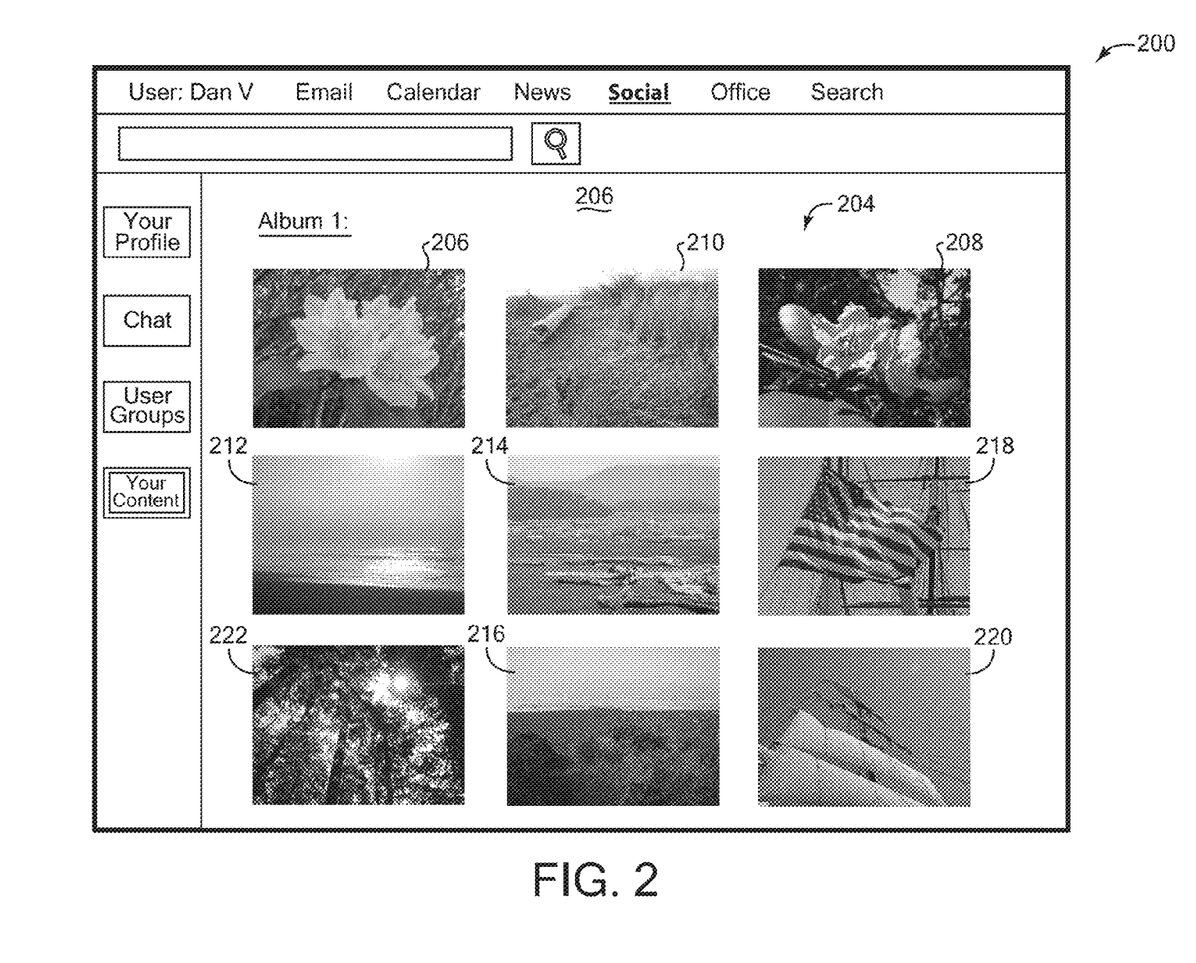
FIG. 2 is illustration of an example graphical user interface (GUI) displaying multiple images which can be color-corrected according to some implementations.

FIG. 2 is a diagrammatic illustration of an example simplified graphical interface (GUI) 200 displaying multiple images which can be color-corrected according to some implementations described herein. GUI 200 can be displayed on a display device, e.g., of a client device 120, 122, 124, and/or 126 of FIG. 1, or a server system 102 in some implementations. In one example, a user can be viewing images on the interface 200 for a social networking service or application running in a social networking service. Other implementations can display images in an application program, operating system, or other service or system.

In the current example, the system displays images 204 in a display area 206 of the interface 200. The images 204 can be stored on one or more storage devices accessible to the interface and/or social network service, such as on the social network database 106. For example, the user may have uploaded the images 204 to the social networking service, or otherwise provided the images for his or her account. In the example of FIG. 2, the images 204 are digital images, such as digital photographs taken by a camera, and stored in an album called Album 1 of the user Dan V. Various images in collections such as albums, or spread among other collections and storage devices, can all be processed by the features described herein.

In the example of FIG. 2, the images 204 have been analyzed by the system (which can be the social networking service, one or more server systems, and/or one or more client devices in various embodiments) using features described herein. Such features can include the system examining the images 204 to determine one or more characteristics that are similar between the images. For example, the system can examine color data including color gamut and/or hue distributions of the images to determine which images have similar gamuts and hue distributions. In this example, the system may find that images 206 and 208 have similar hue distributions, since they largely depict the same types of flowers with the same or similar colors. Similarly, the system may find that images 210, 212, 214, and 216 may have similar hue distributions since they depict similar outdoor areas. Further, images 218 and 220 may be analyzed to have some similar hue distributions, e.g., with similar background sky colors.

The system can also examine the images 204 to determine other characteristics of the images that may be similar. For example, the timestamps of the images can be examined to determine a date and time when the images were captured. In this example, the system may find that images 206 and 208 were captured within an hour of each other on the same date, images 210, 212, 214, and 216 all have timestamps within two hours of each other on the same date. Images 218 and 220 may have timestamps within minutes of each other on the same date. Image 222 may not have a timestamp within months of any of the other images 204 that were examined. Other characteristics of the images can also be examined, such as metadata embedded in an image describing settings or specifications of the camera that took that image. Some implementations can examine characteristics such as identified or recognized content depicted within the image, such as facial recognition of faces of people, other object recognition for other types of objects or features (such as landmarks, items, etc.), or identification by using identifiers such as tags associated with the image and including descriptive information input by a user. For example, the system may be able to recognize flower objects in images 206 and 208, and/or a flag object in the image 218.

The system can group the images 204 into one or more groups based on any similar characteristics found. For example, the system can group the images 206 and 208 into a first group, images 210, 212, 214, and 216 into a second group, and images 218 an 220 into a third group, based on at least some of the characteristics being similar as mentioned above. In some implementations, image 222 can be provided in a group in which it is the only image, if it does not have sufficiently similar characteristics to the other examined images. Other groups of images can be formed in other implementations or variations, based on various criteria as described herein.

The system can determine a color correction for the images in each group, based on related data such as the characteristics of the images in the group, and/or related data from other images or sources. In one example, the system may determine a color correction to the images 206 and 208 in the first group based on an average of the hue distributions of those images, if the hue distributions are found to be unbalanced. In some implementations, that color correction can also be influenced by other data such as other characteristics of those two images, characteristics of other images 204 (such as timestamps), or characteristics of other images or data outside images 204. In an example, a color correction to images 218 and 220 may be influenced by a reference image that is associated with image 218 based on the identified flag object in image 218. For example, an image stored outside of images 204 having a matching or similar recognized flag object may have been found and accessed by the system, and its colors obtained as reference colors on which to base the color correction of images 218 and 220.

Some implementations can estimate a confidence level of the correction to apply to a group of images. The confidence level can be based on the reliability or accuracy of the factors used in determining the color correction, where some factors (such as reference images) can be weighted more than other factors (such as color distribution) used to determine the correction. Some determined corrections may not have enough confidence to be applied at all, such as, in one example, a color-data correction based on a single image such as image 222 that has a less-extreme color distribution.

The system can apply the determined color corrections to the images. In some implementations, a color correction can be applied to each image in the group for which the correction was determined. In one example for FIG. 2, the corrected images can be displayed in place of their original images in interface 200, if those images are currently being displayed. In other implementations, the original and corrected images can both be displayed to the user so as to allow a user to compare the images and to confirm or discard the applied correction.

In contrast, previous implementations of automatic color correction or whitebalancing can often produce undesirable changes in images since the system may only look at color data from the single image to be corrected. This typically does not provide enough information about how to correct the image. For example, the system would not know the conditions under which the image was taken, nor the colors intended or desired by the providing user. By using multiple images for sources of color data, other characteristics, and related data, features described herein can more accurately correct color in one or more images.

Figure 3:
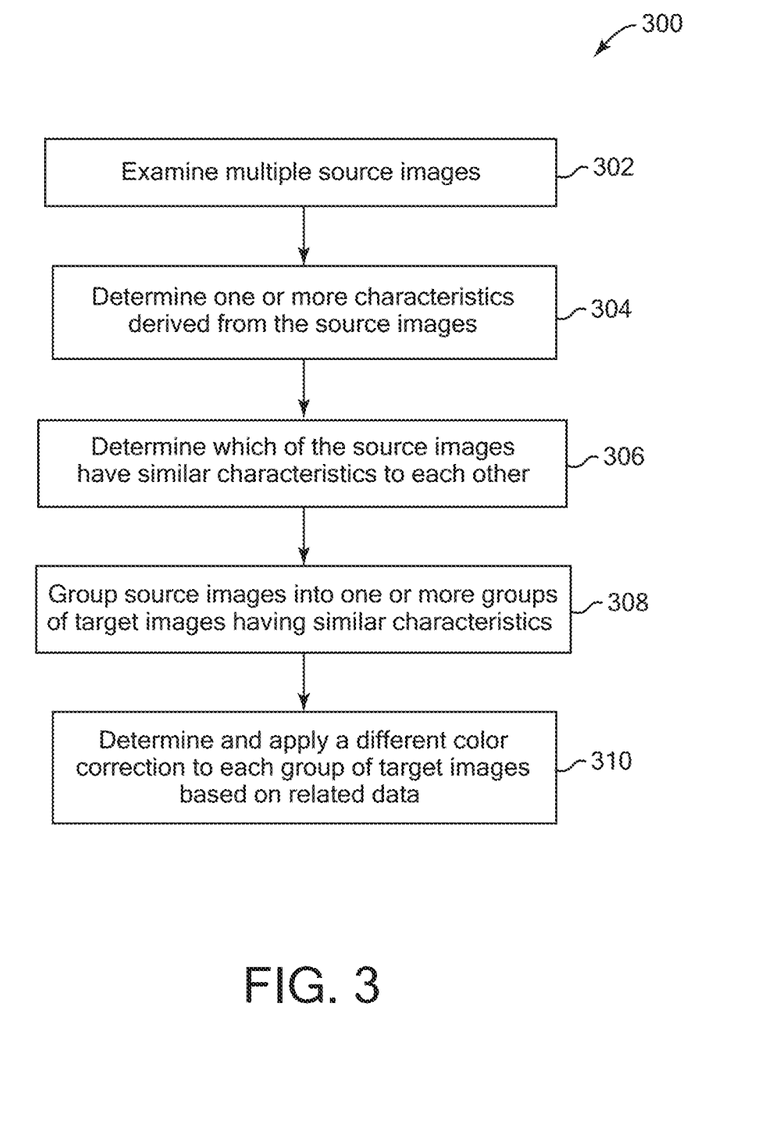
FIG. 3 is a flow diagram illustrating an example method of correcting the color of images based on multiple images, according to some implementations.

FIG. 3 is a flow diagram illustrating one example of a method 300 of correcting the color of images based on multiple images. In some implementations, method 300 can be implemented, for example, on a server system 102 as shown in FIG. 1. In described examples, the server system includes one or more processors or processing circuitry, and one or more storage devices such as a database 106. In some implementations, different components of a server and/or different servers can perform different blocks or other parts of the method 300. In other implementations, some or all of the method 300 can be implemented on one or more client devices. Method 300 can be implemented by program instructions or code, which can be implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The method 300 can be performed as part of or component of an application running on the client device, or as a separate application or software running in conjunction with other applications and operating system.

The method 300 can be initiated by a user, such as a user providing or having access to source images. A user may, for example, have selected the initiation of the method 300 from an interface such as a social networking interface or other graphical interface. In some implementations, the method 300 can be initiated automatically by the system, such as being periodically performed or performed based on a particular event, such as one or more images being newly uploaded to or accessible by the system, or a condition specified in custom preferences of one or more users.

In block 302 of method 300, the method examines multiple source images. In some embodiments, at least one of these source images may need color correction. For example, multiple ones or all of the source images can need or be receptive to color correction in some examples described herein. These images can be digital images composed of multiple pixels, for example, and can be stored on one or more storage devices of the system, or otherwise accessible to the system. For example, the source images can be stored on a single storage device or across multiple storage devices. In some implementations, the source images can be collected in an album or other collection associated with a particular user of the system, such as an album provided in an account of a user of a social networking system as in the example of FIG. 2. In some examples, the source images can be one or more images from multiple albums or other collections, and/or one or more images associated with multiple users.

The multiple source images can be examined by the system in response to various types of events or conditions. For example, in some implementations, the system can obtain the multiple source images by receiving user input that designates the source images, such as selections of images made by a user in a graphical user interface. In one example, the user can select the multiple images by selecting an album folder or icon, thereby selecting all images within that selected album. In some implementations, the system can designate which multiple source images to examine. For example, the system can scan all content or albums of one or more users and examine, retrieve, and/or store one or more images of the content or albums as source images. In some implementations, the system can examine only new images as source images, which can be images that have not been examined by method 300 since the last time that method 300 was performed by the system.

Some implementations can cause the method 300 to select particular images as source images based on predetermined conditions, such as who is the user providing the images, the creation or capture dates of the images, the dates that the images were first stored on the system, etc. In some implementations, the system can determine which images are to be used as source images by evaluating characteristics of images. For example, the system can examine characteristics such as the color distributions of images, timestamps and other metadata of images, and/or identified content depicted in the images, as described below, and determine the source images to use similarly as described below for determining groups of target images.

In some implementations, the source images can include reference images having reference characteristics. For example, particular images may be known to have been color-corrected previously and thus can be used as reference images that include reference color data. Reference color data may be able to be used in the color correction of other source images in the method 300, as described in greater detail below. In some implementations, reference images and/or reference data can also be stored outside of or external to the source images.

In block 304, the method determines one or more characteristics derived from the source images. The characteristics can be a variety of types. For example, color data characteristics can be determined for each image based on color data obtained from each image. In some implementations, the color data can include hues, and the method can determine a color gamut (e.g., a complete set or range of colors found within an image) of hues by examining the entire range of hue values of the pixels of the image. The method can also determine the distribution of hues in that image by, for example, examining the hues in each pixel of the image and performing a clustering technique (or other technique) for each image. The distribution can indicate which hues are the dominant or most-occurring hues in each image. In some examples, K-means clustering can be used to cluster hues and determine the dominant hues in an image, by taking each pixel, convert it from RGB values to an HSV (hue, saturation, value) color space, and construct a histogram across the hues to determine which bins in the histogram have the highest number of counts. Some such techniques can use clusters that vary and are adaptive in size, allowing, for example, discrimination of different shades of colors in the distribution. Many variations of clustering techniques or other techniques can be used to determine color distributions of each image in various implementations.

Other types of color data (e.g., other hue properties and/or other color properties) or other visual characteristics can also be determined from the source images in various implementations. For example, average hues in each image can be determined. In some implementations, a brightness characteristic of each source image can be determined. For example, the brightness of each pixel can be obtained from each image and provided in a distribution to determine an overall brightness of the image. Other types of color data to be determined can include a color saturation or other color properties.

Other types of characteristic that can be derived from the source images include metadata characteristics. For example, one such characteristic is a timestamp associated with each of one or more of the source images. The timestamp can indicate the date and/or time that the associated image was captured by a camera or other device. For example, some cameras automatically associate or embed a timestamp with each image captured and stored the timestamp information with the image as metadata. Other types of metadata can also be embedded in the source images and obtained and determined as characteristics in block 304. For example, some cameras embed metadata in each image file which includes data describing the identity of the camera taking the image (e.g., make, model, year, etc.), the lens type used, ISO speed used for the image, and/or the color settings, whitebalance settings, and/or other settings of the camera that were used to capture the image, any or all of which can be determined as characteristics in block 304. In some implementations, metadata stored with images according to the Exchangeable Image File format (Exif) can be determined as image characteristics.

In some implementations, identified content depicted in the images can be obtained as a characteristic. For example, object identification techniques can be used to recognize common objects depicted in an image. Some object identification techniques include facial recognition techniques which can recognize a face in an image. For example, in a social networking service, a recognized face can be compared to faces of users of the service to identify which people depicted in images are also users of the service. Some images can be associated with identifiers such as tags that describe content depicted in the image, and these tags can be obtained or parsed as identifications of depicted content.

In block 306, the method determines one or more similarities between the characteristics of the different source images, e.g., which source images have similar characteristics to each other. In some implementations, one or more corresponding types of image characteristics determined in block 304 can be compared to determine image similarity. For example, the color gamuts can be compared, and/or the color distribution can be compared in different source images for similarity. In some implementations, hues of each source image can be clustered, and each clustered distribution can be examined to determine which colors dominate. The color distributions of two images can be considered similar if the dominant hues are within a predetermined range or percentage of each other. In one example, the method can determine that the hues of red dominate in some source images, and no other hues dominate. These distributions can be considered similar if within a predetermined range of each other. Some source images may have color distributions with dominant red hues but also some clusters around blue and/or green hues. Such distributions can be considered similar if each of the hue clusters is within predetermined ranges or percentages of each other. The gamut characteristics from the source images can similarly be compared with each other, where gamuts within a particular range or percentage of each other can be considered similar.

The method can also examine other characteristics to determine similarity of those characteristics in between different source images. In some implementations, timestamps and/or other metadata characteristics can be examined for similarity. For example, if a characteristic matches or is within a predetermined range in two or more images, that characteristic can be considered similar in those images. In some examples, timestamp characteristics within a predetermined amount of time of each other, such as one hour, can be considered similar, or can produce a sliding or variable scale of similarity based on the closeness of their timestamps. Some characteristics such as camera model or lens type can be considered similar only if they are exact matches, or in other implementations different characteristics can be considered similar if those characteristics are correlated in a predetermined information source such as a lookup table accessible to the method 300.

In some implementations, identified content depicted in the images can be compared to find similarity. Thus, in some implementations, if two source images have the same or similar identified content, such as the same general category of people, objects, landmarks or landscape features, etc., or more specifically-identified instances of this content (such as identified users, specific models of products, etc.), these characteristics can be considered similar.

In block 308, the method groups the source images into one or more groups as target images that have similar characteristics. In some implementations, source images that are considered to be sufficiently similar are designated as target images within the same group. The method can use any of various ways in determining that two or more source images are sufficiently similar so as to form a group. In some implementations, the method can examine a particular characteristic is similar, such as the color gamut and/or distribution as described above, and group source images based on the similarity of that particular characteristic. Some implementations can examine multiple particular characteristics to determine similarity for grouping. In a particular example, the method can collect source images together into a group if those source images have a similar color gamut and distribution as well as a similar timestamp. In some implementations, the more characteristics that match between two images, the more similar those images are considered, on a variable scale. Some implementations can use a similarity threshold to determine whether to group the source images. For example, images that have at least a predetermined number of similar characteristics can be considered sufficiently similar to be grouped. In some implementations, particular characteristics can be prioritized over other characteristics for grouping according to their similarities, and/or different types of characteristics can be assigned different priority levels in a priority scale. In one nonlimiting example implementation, a color data characteristic can be assigned to have the highest priority when looking for similarities to determine how images are to be grouped, while other characteristics can be assigned different, lower priorities.

In some implementations, the method can determine multiple groups of target images in block 308 by finding different sets of source images having similar characteristics. For example, three source images may have the same or similar color data (e.g., gamut and distributions) and timestamps and so would be grouped into a first group of target images, and five other source images may have color data and timestamps similar to each other but different from the source images in the first group, and are grouped into a second group of target images. All of the source images can be grouped into one or more groups in some implementations, where one or more of the groups may each have only one target image if other images having sufficient similarity to that target image were not found in the source images. In some implementations, a particular source image is allowed to be in only one group at a time. Some implementations can treat each group as its own independent set of target images for application of at least one color correction to the target images.

Some implementations can allow other data to influence the grouping of the source images into different groups. For example, if the system has previously analyzed and grouped the source images in a previous iteration of the method 300, and the color correction was found to be unsuccessful or unsatisfying to the user or to objective criteria, then the system can group the source images in a different way in this iteration that is different than one or more previous iterations. In some implementations, user input or stored preferences can influence how the images are grouped in block 308. For example, one particular user may prefer to prioritize the color data characteristic similarities more than other similarities when deciding which images to group, while a different user may prefer to prioritize similarities in a different characteristic such as timestamps over other characteristics. Or, a particular user may set a minimum number of images that must be found similar to each other for a group of them to be formed and for color correction to be performed on those images.

In block 310, the method determines and applies a different color correction to each group of target images based on related data. For example, the related data can include the characteristics determined in block 304, as well as any other accessible data relating to the target images, such as data from other source images, reference images, etc. Some examples of implementing block 310 are described in greater detail below with respect to FIG. 4. After block 310 is completed, grouped target images have been color-corrected and the method ends. If one or more of the corrected target images was being displayed by the system, the color correction can be applied so as to update the display of those images.

In some embodiments, the system can prompt user approval. For example, the source images including any corrected versions can be displayed in a graphical interface to the user for review, and the user can select any corrected images which the user does not approve of the correction, such that the correction is discarded. Some embodiments can display the original, uncorrected images as well so that the user can compare original and corrected images.

Thus, described features allow characteristics of multiple images to be used to group those images into different groups in which the same color correction can be applied to multiple images in each group. The characteristics of the multiple grouped images can be used to determine the color correction to be applied to those images, allowing more accurate and satisfactory color correction of images since the correction is based on characteristics obtained from multiple images. Furthermore, the color correction can efficiently correct multiple similar images with a determined color correction.

Figure 4:
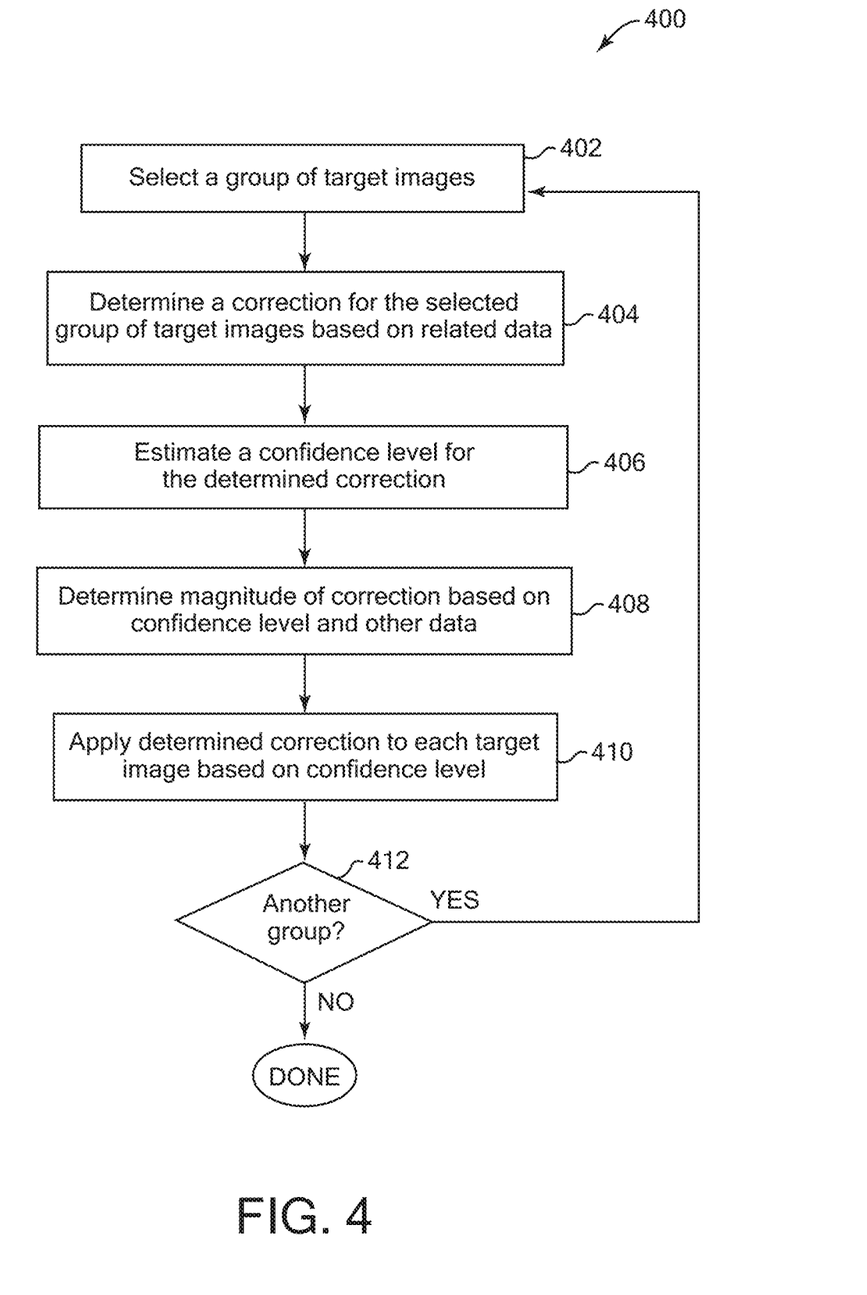
FIG. 4 is a flow diagram illustrating an example method of determining and applying color corrections to grouped images, according to some implementations.

FIG. 4 is a flow diagram illustrating an example method 400 for block 310 of FIG. 3, in which the method determines and applies one or more color corrections to grouped target images, according to some implementations. Method 400 can be implemented on one or more systems similarly as described above for method 300 of FIG. 3.

In block 402, the method selects a group of target images to correct. This group is a number of the source images that have been grouped as being sufficiently similar to receive the same color correction, as described above with reference to FIG. 3. In some implementations, there may be multiple groups having different target images, where each group includes one or more target images that are similar to each other and are intended for a particular color correction.

In block 404, the method determines a color correction for the selected group of target images based on related data. In some implementations, this can be a color balancing of the target images. The related data can include characteristics of the target images, and/or data derived from other source images and/or reference images or color data. For example, the correction can be determined based on characteristics such as image characteristics of the target images and/or source images, such as the example characteristics described above with reference to FIG. 3.

In some implementations, one characteristic used in determining the color correction can be color data derived from the target images, such as the color gamut and distribution data determined above in block 304 of FIG. 3. The color gamut data can indicate the total range of colors existing in a target image, and whether the range is narrowly focussed on a few hues or more balanced and spread over many different hues. The color distribution data can include clusters of hues of a target image, indicating which particular hues dominate in those images. The gamuts and distributions from each target image in the selected group can be combined to obtain an overall gamut and overall distribution for all the target images in the group. For example, the individual gamuts can be averaged to obtain an overall gamut, and individual distributions can be averaged to obtain the overall distribution.

From color data such as the gamut and distribution of color properties from the target images in the selected group, such as the averaged hue distribution and gamut described above, the method can infer a reference white point and can determine a color correction that should be applied to color balance the images using one or more color correction techniques. For example, inferring a white point from a given hue distribution and gamut can be performed using any of known techniques. In some implementations, the color correction techniques can include one or more hue shifting or tinting techniques in which existing hue values are shifted to desired hue values. Furthermore, the color data such as the gamut and distribution of hues can indicate a magnitude of the correction. Typically, a large gamut and a balanced distribution of hues over different hues indicates an image that has at least partially correct colors. For example, hues of red may dominate in the target images of the selected group with few or no clusters of hues in the other values such as blue or green, as indicated in a clustered distribution. Such a distribution can indicate that those target images may have a reddish cast to them. A color correction can be determined to balance the color distribution into the other non-red hues. In another example, the distribution may show that the target images have red hue domination but also some clusters around blue and/or green hues in their distributions, indicating a more balanced color distribution may exist in those target images. Thus, a color correction of lesser magnitude can be determined to only slightly balance the hues from red into the other hues.

In some implementations, reference colors and/or data can be used in determining the color correction. For example, one or more of the target images in the selected group may be known to have been previously color corrected. In one example, a particular user who is associated with the source images may have color-corrected one or more of the source images previously, using manual color correction techniques or a different color correcting method. In some implementations, this corrected status can be determined, for example, by examining a history of actions within an environment (such as data describing actions in an account or application program in a social networking service), and/or this history can be stored as data associated with the source images. In some implementations, each source image can include a flag or other data indicating that it has previously been color corrected with features described herein and/or with other methods or techniques.

If any of the target images has been previously color corrected, then those images can be used as a reference for the other images in the selected group. For example, in some implementations one or more color-corrected images may be included in the group with uncorrected images because it has similarities in characteristics such as timestamps. The corrected colors in the corrected image can be used to correct equivalent colors in the uncorrected images in the same group.

In some implementations, other reference color data can be available for use in determining the color correction. For example, content depicted in the target images can be identified as a similar characteristic of the target images, where the same or similar content is depicted in each image in the selected group. The identified content can be used to find one or more other images having that same content which can be used as reference images. These reference images may not be included in the selected group of target images, and/or may not be included in the set of source images. For example, the reference images may include reference colors that can be used to correct the colors in the target images. In some implementations, such reference images can be found by matching the identified content to content identified in the reference images. In one example, object recognition techniques, including facial recognition techniques, may have identified a particular user of a software system such as a social networking service, who is depicted in the target images of the selected group. This identification of the user can be used to match one or more other images known to depict that same user. These other images may be known to be color corrected, or in other cases may not be known to be corrected, but which can still be used as reference images. The color values from such images can also be combined and/or averaged, increasing their value as references even if not previous color corrected. Thus the colors of the reference images can be used as reference colors to determine the correction for the target images in the selected group that depict that same user. In some implementations, the identification of content can allow the system to identify reference color data that is not associated with any particular reference image, but is a color profile or other set of data stored independently. For example, an identified user or an identified well-known logo or product depicted in the target images can cause the system to reference a particular color profile associated with each of those identified objects, thus gaining access directly to reference colors used to determine a color correction for the selected group of target images.

In some implementations, other characteristics can be used to influence the determination of the color correction. For example, the timestamps, lens type of camera capturing the target images, or other metadata of the images, and/or content identified in the images, can influence the determined color correction. In some implementations, such other characteristics can be used to find matching reference images or reference data as described herein. In some examples, such characteristics can be used to indicate the most likely correction that should be used to satisfactorily correct the color, such as timestamps that indicate a particular time of day and environmental lighting conditions in an outdoor area, and/or indicate a time in a calendar season indicating typical or likely ambient outdoor conditions (less light in fall or winter, wet vs. dry conditions, etc.). Or, a characteristic may indicate the type of camera lens used for the image and known to capture particular color defects which can be corrected.

Some implementations can examine characteristics derived from one or more of the source images that were not in the selected group with the target images. For example, timestamps of all the source images can be examined to determine a pattern of light conditions over all the source images corresponding to the time of day of image capture. This analysis can help determine a particular color correction for the target images in the selected group based on the timestamps of those target images, e.g., if they are late in the day, the color correction can assume darker environmental conditions during the capture of the target images. Other source images can confirm or make more certain particular assumptions made about the target images, such as the settings of the camera taking the target images and other source images.

Some implementations can determine a different color correction for at least one, or each, target image in the selected group. For example, a determined color correction may need to be varied to take into account particular differences in each target image in the group. In some examples, the system can analyze variances in characteristics within target images of the selected group (and/or in other source images or reference images) to determine the color correction. In one example, the target images in the selected group may have different ambient light conditions or brightnesses corresponding to timestamps showing different times of a day. The hues or brightnesses of each image can be compared to its timestamp to determine a particular magnitude of the color correction for that image, where a timestamp indicating an evening time of image capture causes a larger brightness and/or hue shade correction than a timestamp indicating an earlier time of image capture. Other characteristics can indicate variations of the color correction to be applied among one or more of the target images.

In block 406, the method estimates a confidence level in the correction determined in block 404. The confidence level can indicate the probability that the determined correction will correct the colors of the target images in the selected group in a satisfactory or preferred way (e.g., satisfactory or preferred to a user providing the target images, or to general persons in various implementations). This confidence level can be determined based on the accuracy and/or reliability of various factors that were used to determine the correction in block 404, such as the types of image characteristics and other data. In some implementations, each type of factor can be assigned a particular confidence level, and if multiple types of factors were used to determine the correction in block 404, the individual confidence levels of the factors can be summed to obtain an overall confidence level for the correction.

In some implementations, probabilistic inference techniques can be used to estimate the confidence level (and/or, conversely, the uncertainty) of the determined correction. For example, a probabilistic inference technique can estimate a confidence level based on multiple factors used in the correction determination. These factors can include a quality of the overall distribution of hues in the target images, where an overall distribution having one prominent hue and little or no other hues indicates that a correction based on rebalancing those hues is more certain to correct the color than a distribution in which the hues are more spread out or partially balanced. The factors can also include the number of target images in the group and used to determine the distribution (or otherwise determine the correction), where the more target images were used to determine the average gamut and/or distribution used in the correction, the greater the certainty that the correction will be satisfactory. The factors can also include whether one or more reference images or reference color data was used in the determination of the correction, where each reference used increases the confidence of the correction.

The factors can also include other characteristics of target images in the group that match or are similar, where each such match or similarity can increase the confidence level. For example, there may be some groups in which the target images were grouped based on one characteristic, such as the color data of the images, and other characteristics were not a basis of the grouping. In such groups, those other characteristics can be examined to determine the confidence of the correction. For example, each timestamp of the target images that is close to (e.g., within a predetermined time range of) a timestamp of a different one of the target images in the group can increase the confidence level of the correction, since it indicates environmental and lighting conditions under which the images were captured were likely similar. In some implementations, the factors used in the confidence estimation can be any of the factors described previously which can be used for determining the color correction, such as any characteristics of the target images, other source images, and/or other reference images or data.

Some implementations can assign different weights or magnitudes to the different factors used in determining confidence level, based on the reliability of those factors. For example, determining a color correction based on a hue distribution averaged over two images may have less reliability than a correction based on hue distribution over 10 similar images. Furthermore, the two-image distribution may be less extreme, showing a small balance in hues, while the 10-image distribution may be more extreme, showing one dominant hue and much less balance. Thus, the 10-image hue distribution factor can be weighted more than the two-image factor. The 10-image factor may be less reliable than a factor based on reference color data such as from a previously-corrected image, reference image, or other source, which typically is very reliable in correcting colors of images. Thus, the reference color factor can be weighted more than the 10-image factor in the confidence level determination.

In block 408, the method determines a magnitude (or strength) of the determined correction to apply to the target images based on the estimated confidence level and any other applicable data. In some implementations, the higher the confidence level, the higher the magnitude is set for the correction, since the greater confidence allows the system to be more bold with corrections. However, if the confidence level of the correction is low, then it is more uncertain whether the determined correction will change the image satisfactorily, and so the correction can be applied more lightly to be more conservative. In some implementations, a confidence level that is below a predetermined threshold level can result in the method applying no color correction at all to the target images, e.g., at zero magnitude.

In block 410, the determined correction is applied at the determined magnitude to each of the target images in the selected group. In some implementations, the method can perform a transformation on the target images. For example, the RGB values can be converted to HSV values, where the hues can be interpolated to derive new hues. For example, the system can examine the difference between the hues of the current target image and the desired hues that the method wishes to achieve in that image, to determine a hue delta for the image as a whole. The hues are then adjusted by the delta. In some implementations as described above, variations of the color correction can be applied to different target images in the selected group based on particular conditions and characteristics examined.

In block 412, the method checks whether there is another group of target images to color-correct using method 400. If so, then the method returns to block 402 to select another group of target images. If there are no further groups of target images to correct, then the process is complete. In some implementations, the corrected images can be displayed on a display device, such as in a graphical interface as in FIG. 2 if applicable. In some implementations, the corrected images can be displayed in place of their former original versions.

Some implementations can prompt the user to confirm each corrected image or all of the corrected images together, before the corrected images are caused to replace the original versions (or copies of the original versions can be stored separately). For example, the original and corrected versions of the images can be displayed simultaneously to a user so that the user can easily compare original and corrected versions.

In some cases, a color correction may not be applied to grouped target images. For example, the confidence level for a group may be too low, or a user may reject the correction(s). In some implementations, if a color correction is not applied to certain images when performing methods 300 and 400, the method can perform methods 300 and 400 again in an attempt to correct the colors of those images in a different way. For example, the method can form new and different groups of target images from the source images and determine different color corrections based on those new groups. In one example, the method can set priorities differently for image characteristics and/or examine additional or different characteristics that were not examined in the previous iteration, and can group one or more of the source images according to different similar characteristics to determine a different color correction based on the differently-grouped target images.

Other variations can be used in other implementations of the described features. For example, some implementations can correct other color properties of an image besides the color cast or color balance. Some implementations of the described features can correct different image properties such as brightness, contrast, clarity, or sharpness.

It should be noted that the blocks described in the methods of FIGS. 3 and 4 can be performed in a different order than shown and/or simultaneously (partially or completely) with other blocks, where appropriate. In some implementations, blocks can occur multiple times, in a different order, and/or at different times in the methods. In some implementations, methods 300 and/or 400 can be implemented, for example, on a server system 102 as shown in FIG. 1. In some implementations, one or more client devices can perform one or more blocks instead of or in addition to a server system performing those blocks.

Figure 5:
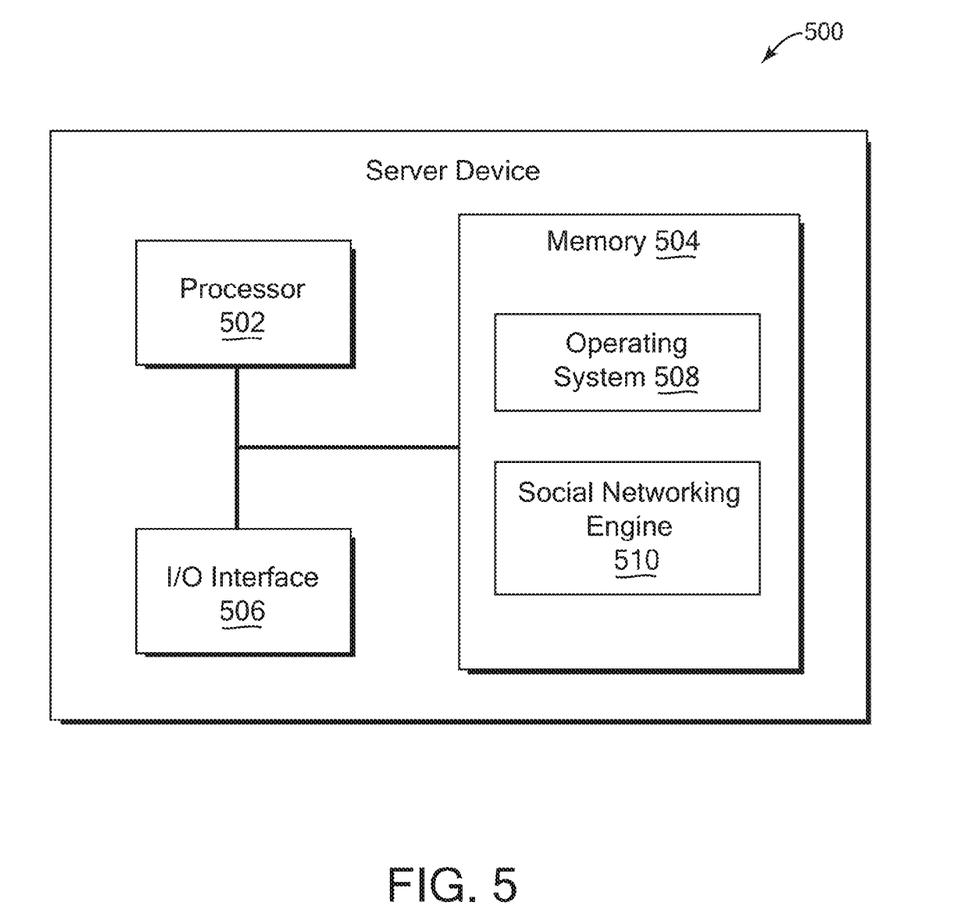
FIG. 5 is a block diagram of an example device which may be used for one or more implementations described herein.

FIG. 5 is a block diagram of an example device 500 which may be used to implement some implementations described herein. In one example, device 500 may be used to implement server device 104 of FIG. 1, and perform appropriate method implementations described herein. Server device 500 can be any suitable computer system, server, or other electronic or hardware device. For example, the server device 500 can be a mainframe computer, desktop computer, workstation, portable computer, or electronic device (portable device, cell phone, smart phone, tablet computer, television, TV set top box, personal digital assistant (PDA), media player, game device, etc.). In some implementations, server device 500 includes a processor 502, a memory 504, and input/output (I/O) interface 506.

Processor 502 can be one or more processors or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508 and a social networking engine 510 (and/or other applications) in some implementations. In some implementations, the social networking engine 510 or other application engine can include instructions that enable processor 502 to perform the functions described herein, e.g., some or all of the methods of FIGS. 3 and/or 4. Any of software in memory 504 can alternatively be stored on any other suitable storage location or computer-readable medium. In addition, memory 504 (and/or other connected storage device(s)) can store privacy settings, content, and other data used in the features described herein. Memory 504 and any other type of storage (magnetic disk, optical disk, magnetic tape, or other tangible media) can be considered "storage devices."

I/O interface 506 can provide functions to enable interfacing the server device 500 with other systems and devices. For example, network communication devices, storage devices such as memory and/or database 106, and input/output devices can communicate via interface 506. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 5 shows one block for each of processor 502, memory 504, I/O interface 506, and software blocks 508 and 510. These blocks may represent one or more processors or processing circuitries, operating systems, memories, I/O interfaces, applications, and/or software modules. In other implementations, server device 500 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 500, such as processor(s) 502, memory 504, and I/O interface 506. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions.

Although the description has been described with respect to particular implementations thereof, these particular implementations are merely illustrative, and not restrictive. Concepts illustrated in the examples may be applied to other examples and implementations.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A computer-implemented method to correct image color, the method comprising:
   obtaining a plurality of images having one or more similarities in one or more characteristics of the plurality of images;
   determining, using a hardware processor, one or more color corrections for the plurality of images;
   estimating one or more confidence levels associated with the one or more color corrections; and
   applying the one or more color corrections to the plurality of images with a magnitude based on the associated one or more confidence levels.

2. The method of claim 1 wherein the one or more confidence levels are based on at least one of:
   the one or more characteristics of the plurality of images; and
   the one or more similarities in the one or more characteristics of the plurality of images.

3. The method of claim 1 wherein the one or more confidence levels are based at least in part on the number of images in the plurality of images.

4. The method of claim 1 wherein the one or more confidence levels are based on a plurality of factors used to determine the one or more color corrections, wherein one or more of the plurality of factors are weighted more than one or more other factors of the plurality of factors in the estimation of the one or more confidence levels.

5. The method of claim 4 wherein the plurality of factors used to determine the one or more color corrections include at least one of:
   one or more hue distributions in the plurality of images; and
   one or more reference colors obtained from one or more reference images associated with one or more of the plurality of images.

6. The method of claim 1 wherein estimating the one or more confidence levels includes estimating the one or more confidence levels based on a plurality of factors used to determine the one or more color corrections, including assigning each factor an individual confidence level and summing the individual confidence levels of the factors to obtain an overall confidence level for the one or more color corrections.

7. The method of claim 1 wherein the one or more confidence levels are based at least in part on timestamps of the plurality of images being within a predetermined time range of each other.

8. The method of claim 1 wherein the one or more characteristics include color data derived from hues of pixels of the source images, wherein the one or more color corrections adjust one or more hues of the pixels in the one or more target images.

9. The method of claim 1 wherein the one or more characteristics includes at least one of: a time of capture of each image, a setting of a camera capturing each image, a distribution of color data in each image, and at least one object depicted in each image.

10. The method of claim 1 wherein the color correction is based on a hue distribution averaged over the plurality of images, and wherein the estimated confidence level is based at least in part on the number of images over which the hue distribution is averaged.

11. The method of claim 1 further comprising:
    determining one or more characteristics of each of multiple source images, wherein the plurality of images are included in the multiple source images;
    determining the one or more similarities between the one or more characteristics of the plurality of images; and
    grouping the plurality of images into a group, wherein the group is different than one or more other groups of other images of the multiple source images.

12. The method of claim 1 further comprising:
    determining that at least one of the one or more color corrections does not affect at least one of the plurality of images;
    determining one or more different color corrections for the at least one of the plurality of images; and
    repeating the estimating and applying using the one or more different color corrections for the at least one of the plurality of images.

13. The method of claim 12 wherein determining that at least one of the one or more color corrections does not affect at least one of the plurality of images is based on at least one of:
    the one or more confidence levels associated with the at least one of the one or more color corrections; and
    input from a user rejecting the at least one of the one or more color corrections.

14. The method of claim 1 wherein the one or more color corrections correct at least one color property of the plurality of images, the at least one color property including at least one of: color balance, brightness, contrast, and sharpness.

15. A system to correct image color, the system comprising:
    a storage device; and
    at least one processor operative to access the storage device and configured to:
       obtain a plurality of images having one or more similarities in one or more characteristics of the plurality of images;
       determine one or more color corrections for the plurality of images;
       estimate one or more confidence levels associated with the one or more color corrections;
       determine which of the one or more color corrections are qualified to be applied based on the associated one or more confidence levels; and
       apply the one or more qualifying color corrections to the plurality of images with a magnitude based on the associated one or more confidence levels.

16. The system of claim 15 wherein the one or more confidence levels are based on at least one of:
    the one or more characteristics of the plurality of images;
    the one or more similarities in the one or more characteristics of the plurality of images;
    a plurality of factors used to determine the associated one or more color corrections; and
    the number of images in the plurality of images.

17. The system of claim 15 wherein the one or more confidence levels are based on a plurality of factors used to determine the one or more color corrections, wherein one or more of the plurality of factors are weighted more than one or more other factors of the plurality of factors in the estimation of the one or more confidence levels.

18. A computer readable storage medium having stored thereon instructions to correct image color that, when implemented by a processor, cause the processor to:
    obtain a plurality of images having one or more similarities in one or more characteristics of the plurality of images;

determine, using a hardware processor, one or more color corrections for the plurality of images;
estimate one or more confidence levels associated with the one or more color corrections; and
apply the one or more color corrections to the plurality of images with a magnitude based on the associated one or more confidence levels.

19. The computer readable medium of claim 18 wherein the one or more confidence levels are based on at least one of:
the one or more characteristics of the plurality of images;
the one or more similarities in the one or more characteristics of the plurality of images;
a plurality of factors used to determine the associated one or more color corrections; and
the number of images in the plurality of images.

20. The computer readable medium of claim 18 wherein the instructions causing the processor to estimate the one or more confidence levels includes instructions causing the processor to estimate the one or more confidence levels based on a plurality of factors used to determine the one or more color corrections, including assigning each factor an individual confidence level and summing the individual confidence levels of the factors to obtain an overall confidence level for the one or more color corrections.

* * * * *